United States Patent
Wigard et al.

(10) Patent No.: US 8,908,612 B2
(45) Date of Patent: Dec. 9, 2014

(54) APPARATUS, METHOD AND COMPUTER PROGRAM PRODUCT PROVIDING USAGE OF E-DCH AS RACH SHARED CHANNEL

(75) Inventors: Jeroen Wigard, Klarup (DK); Karri Ranta-Aho, Espoo (FI); Harri Holma, Helsinki (FI)

(73) Assignee: Nokia Corporation, Espoo (FI)

( * ) Notice: Subject to any disclaimer, the term of this patent is extended or adjusted under 35 U.S.C. 154(b) by 54 days.

(21) Appl. No.: 12/226,540

(22) PCT Filed: Sep. 27, 2007

(86) PCT No.: PCT/IB2007/002852
§ 371 (c)(1),
(2), (4) Date: Apr. 21, 2009

(87) PCT Pub. No.: WO2008/038124
PCT Pub. Date: Apr. 3, 2008

(65) Prior Publication Data
US 2009/0268676 A1 Oct. 29, 2009

Related U.S. Application Data

(60) Provisional application No. 60/848,106, filed on Sep. 29, 2006.

(51) Int. Cl.
*H04W 4/00* (2009.01)
*H04W 74/08* (2009.01)
*H04W 72/04* (2009.01)

(52) U.S. Cl.
CPC ...... *H04W 74/0866* (2013.01); *H04W 72/0406* (2013.01)
USPC .......................................... 370/329; 455/450

(58) Field of Classification Search
CPC . H04W 74/0833; H04W 16/10; H04W 28/26; H04W 52/14; H04W 74/0866
See application file for complete search history.

(56) References Cited

U.S. PATENT DOCUMENTS

| 5,796,738 A | 8/1998 | Scott et al. |
| 5,960,445 A | 9/1999 | Tamori et al. |

(Continued)

FOREIGN PATENT DOCUMENTS

| EP | 1 400 049 A0 | 1/2003 |
| EP | 1 743 503 A0 | 11/2005 |

(Continued)

OTHER PUBLICATIONS

"Adaptive Channel Switching for Admission Control with QoS and Priority in WCDMA Uplink", Ding Cao et al., IEEE 2004, pp. 69-76.

(Continued)

*Primary Examiner* — German J Viana Di Prisco
(74) *Attorney, Agent, or Firm* — Harrington & Smith (57) ABSTRACT

Apparatus, methods and computer program products in a wireless communications system provide an enhanced dedicated channel (E-DCH) for use by user equipment operating in the wireless communications system for use in conjunction with the random access procedure. The user equipment has circuitry to request a HS random access channel and, in response to receiving an assignment from a Node B of a dedicated mode channel for use as the random access channel, to send uplink data in a random access fashion over the assigned dedicated mode channel while receiving feedback from the Node B over at least one downlink L1 feedback channel. The Node B has circuitry to assign to the UE the dedicated mode channel for use as the random access channel, to receive uplink data in a random access fashion over the assigned dedicated mode channel, and to send feedback information to the UE over at least one downlink L1 feedback channel.

22 Claims, 4 Drawing Sheets (56) References Cited

U.S. PATENT DOCUMENTS

| | | | |
|---|---|---|---|
| 5,966,636 A | 10/1999 | Corrigan et al. | |
| 6,098,126 A | 8/2000 | Batson et al. | |
| 6,272,117 B1 | 8/2001 | Choi et al. | |
| 6,282,644 B1 | 8/2001 | Ko | |
| 6,574,267 B1 | 6/2003 | Kanterakis et al. | 375/141 |
| 6,611,514 B1 | 8/2003 | Moulsley | |
| 6,643,318 B1 | 11/2003 | Parsa et al. | 375/141 |
| 6,738,366 B1 | 5/2004 | Etemad et al. | |
| 7,013,146 B2 | 3/2006 | Wang et al. | 455/455 |
| 7,136,994 B2 | 11/2006 | Zimmer et al. | |
| 7,293,165 B1 | 11/2007 | Tobias | |
| 2003/0223452 A1 | 12/2003 | Toskala et al. | |
| 2004/0110521 A1 | 6/2004 | Soldani et al. | 455/509 |
| 2004/0136403 A1* | 7/2004 | Kekki | 370/477 |
| 2004/0264497 A1* | 12/2004 | Wang et al. | 370/465 |
| 2005/0047344 A1 | 3/2005 | Seol | |
| 2005/0122933 A1 | 6/2005 | Kwon et al. | |
| 2005/0157678 A1 | 7/2005 | Mantha et al. | 370/329 |
| 2005/0243763 A1* | 11/2005 | Toskala et al. | 370/328 |
| 2005/0271025 A1 | 12/2005 | Guethaus et al. | 370/342 |
| 2006/0146762 A1 | 7/2006 | Kuroda et al. | 370/335 |
| 2006/0167919 A1 | 7/2006 | Hsieh | |
| 2006/0168189 A1 | 7/2006 | Huang | |
| 2006/0183429 A1 | 8/2006 | Anderson | 455/67.13 |
| 2006/0209692 A1 | 9/2006 | Usuda et al. | 370/232 |
| 2006/0268717 A1* | 11/2006 | Kanterakis | 370/235 |
| 2006/0281417 A1 | 12/2006 | Umesh et al. | 455/69 |
| 2007/0064665 A1 | 3/2007 | Zhang et al. | |
| 2007/0094426 A1 | 4/2007 | Chiang et al. | |
| 2007/0104177 A1 | 5/2007 | Hwang et al. | |
| 2007/0147326 A1 | 6/2007 | Chen | |
| 2007/0186086 A1 | 8/2007 | Lambert et al. | |
| 2007/0189237 A1 | 8/2007 | Jaatinen et al. | 370/335 |
| 2007/0189365 A1 | 8/2007 | Olsson et al. | |
| 2009/0268676 A1 | 10/2009 | Wigard et al. | 370/329 |
| 2010/0182974 A1 | 7/2010 | Barraclough et al. | |
| 2012/0140715 A1 | 6/2012 | Cave et al. | 370/329 |

FOREIGN PATENT DOCUMENTS

| | | |
|---|---|---|
| EP | 1 643 690 | 4/2006 |
| WO | 0021320 A1 | 4/2000 |
| WO | WO 03/003643 A1 | 1/2003 |
| WO | 03100988 A2 | 12/2003 |
| WO | WO 2005/109941 A1 | 11/2005 |
| WO | WO 2008/053321 A2 | 5/2008 |
| WO | WO 2008/156315 A2 | 12/2008 |
| WO | WO 2009/020432 A1 | 2/2009 |

OTHER PUBLICATIONS

R2-061189, 3GPP TSG-RAN WG2 Meeting #53, "Further discussion on delay enhancements in Re17", Nokia, May 2006, 5 pgs.
3GPP TS 25.214 V.7.5.0, "3$^{rd}$ Generation Partnership Project; Technical Specification Group Radio Access Network; Physical layer procedures (FDD) (Release 7)", May 2007, 84 pgs.
3GPP TS 25.308 V7.3.0, "3$^{rd}$ Generation Partnership Project; Technical Specification Group Radio Access Network; High Speed Downlink Packet Access (HSDPA); Overall description; Stage 2 (Release 7)", Jun. 2007, 47 pgs.
3GPP TS 25.211 V4.6.0, "3$^{rd}$ Generation Partnership Project; Technical Specification Group Radio Access Network; Physical channels and mapping of transport channels onto physical channels (FDD) (Release 4)", Sep. 2002, 46 pgs.
3GPP TS 25.212 V4.6.0, "3$^{rd}$ Generation Partnership Project; Technical Specification Group Radio Access Network; Multiplexing and channel coding (FDD) (Release 4)", Sep. 2002, 62 pgs.
3G TS 25.213 V4.4.0, "3$^{rd}$ Generation Partnership Project; Technical Specification Group Radio Access Network; Spreading and modulation (FDD) (Release 4)", Dec. 2003, 26 pgs.
3GPP TS 25.214 V4.6.0, "3$^{rd}$ Generation Partnership Project; Technical Specification Group Radio Access Network; Physical layer procedures (FDD) (Release 4)", Mar. 2003, 53 pgs.
3GPP TS 25.215 V4.8.0, "3$^{rd}$ Generation Partnership Project; Technical Specification Group Radio Access Network; Physical layer—Measurements (FDD) (Release 4)", Mar. 2005, 18 pgs.
Golden Bridge Technology, Intellectual Property, Retrieved on Apr. 18, 2012, Webpage available at: http://www.gbtwireless.com/IntellectualProp.htm.
"Layer 1 Procedure of Non-Synchronized Random Access in E-UTRA", 3GPPTSG RAN WGI Meeing #46bis, RI-062501, Oct. 9-13, 2006, pp. 105.
3$^{rd}$ Generation Partnership Project, Technical Specification Group Radio Access Network Medium Access Control (MAC) protocol Specification, Relates 6:, 3GPP TS 25.321 v6.10.0, Sep. 2006, pp. 1-89.
"3$^{rd}$ Generation Partnership Project; Technical Specification Group Radio Access Network; FDD Enhanced Uplink; Overall Description; Stage 2 (Release 6)", 3GPP TS 25.309 V6.6.0 (Mar. 2006).
Ghosh et al., Overview of Enhanced Uplink for 3GPPW-CDMA, IEEE 59$^{th}$ Vehicular Technology Conference, vol. 4, May 17-19, 2004, pp. 2261-2265.
Reig et al., "Random Access Channel (RACH) Parameters Optimization in WCDMA Systems", IEEE 6th Vehicular Technology Conference, vol. 6, Sep. 26-29, 2004, pp. 4296-4300.
3GPP TS 25.211 V4.0.0 (Mar. 2001); "3rd Generation Partnership Project; Technical Specification Group Radio Access Network; Physical channels and mapping of transport channels onto physical (FDD) (Release 4)"; Mar. 2001; whole document (45 pages).
Etemad, K. "Enhanced Random Access and Reservation Scheme in CDMA2000"; IEEE Personal Communications; Apr. 2001; whole document (7 pages).
Nokia et al.; "Enhanced CELL_FACH State with E-DCH"; 3GPP TSG-RAN WG2 Meeting #59bis; R1-074300: Oct. 8-12, 2007; Shanghai, China: whole document (2 pages).
Nokia et al.; "On collision resolution with Enhanced UL CELL_FACH state"; 3GPP TSG-RAN WG2 Meeting #60; R2-074622; Nov. 5-9, 2007; Jeju, Korea; whole document (3 pages).

* cited by examiner

APPARATUS, METHOD AND COMPUTER PROGRAM PRODUCT PROVIDING USAGE OF E-DCH AS RACH SHARED CHANNEL

CROSS-REFERENCE TO RELATED APPLICATIONS:

This patent application was originally filed as PCT Application No. PCT/IB307/02852 filed Sep. 27, 2007 which claims priority to U.S. Provisional Patent Application No. 60/848,106 filed Sep. 29, 2006, the disclosure of which is incorporated by reference herein in its entirety.

TECHNICAL FIELD

The exemplary and non-limiting embodiments of this invention relate generally to wireless communication systems, methods, devices and computer program products and, more specifically, relate to techniques for sending information from user equipment to a wireless network element over a random access channel.

BACKGROUND

The following abbreviations are herewith defined:
3GPP third generation partnership project
ARQ automatic repeat request
CPCH common packet channel
FACH forward access channel
F-DPCH fractional dedicated physical channel
E-DCH enhanced dedicated channel
E-DPCCH enhanced dedicated physical control channel (uplink L1 information concerning data rate)
E-DPDCH enhanced dedicated physical channel (uplink data channels)
E-HICH E-DCH hybrid ARQ indicator channel (in downlink)
E-AGCH E-DCH absolute grant channel (in downlink)
HS high speed
HSUPA high speed uplink packet access
L1 Layer 1 (physical)
Node-B base station
RACH random access channel
TCP transport control protocol
UE user equipment
WCDMA wideband code division multiple access The data rates for RACH (Release 99) are very low. More specifically, the practical instantaneous data rate is 16 kbps (16 thousand bits per second, or 320 bits in 20 ms) and effectively<10 kbps when preamble power ramping is taken into account. The RACH thus cannot be used in any practical manner for the transmission of large packet calls, and no enhancements to RACH were proposed in later releases (post Release 99). Further, in the event of a failed RACH transmission the retransmission delays can be significant, on the order of seconds.

In addition, in Release 99 the RACH setup times from CELL_FACH to CELL_DCH are substantial. This leads to considerably longer delays than needed for medium size packets. Using the HSUPA physical channel increases the data rates considerably. The data transfer in CELL_FACH with the enhanced data rate can continue, except for a small gap, during the switching to CELL_DCH, and can be expected to enhance the end user experience.

A HS-FACH concept has been introduced in 3GPP Release 7, the first proposal of this concept was in R2-061189, "Further discussion on delay enhancements in Rel7", Nokia, 8th-12 May 2006. The HS-FACH can provide downlink FACH data rates of hundreds of kbps to greater than 1 Mbps (million bits per second). Enhanced FACH is already agreed as part of 3GPP Release 7. See, for example, TS25.214 http://www.3gpp.org/ftp/Specs/archive/25-series/25.214/25214-750.zip 6A.1.1A UE procedure for receiving HS-DSCH and HS-SCCH in CELL_FACH state 6A.1.1B UE procedure for receiving HS-DSCH and HS-SCCH in the URA_PCH and CELL_PCH states,
and TS25.308; http://www.3gpp.org/ftp/Specs/archive/25_series/25.308/25308-730.zip
14 HS-DSCH reception in CELL_FACH state (FDD only)
15 HS-DSCH reception in CELL_PCH and URA_PCH states (FDD only).

However, in order to obtain the benefit of the improved downlink FACH capability corresponding improvements would be needed in the uplink RACH capabilities. Especially for TCP-based applications, the end user experience will depend mainly on the uplink data rates if the downlink data rates are significantly increased, since TCP acknowledgements are sent in the reverse link and the overall round trip time determines the overall user experience.

A CPCH was included in 3GPP Release 99 specifications and in some subsequent releases as well. The CPCH was intended to be an extension of RACH. Reference in this regard can be made to: 3GPP TS25.211, V4.6.0 (2002-09), 3rd generation Partnership Project; Technical Specification Group Radio Access Network; Physical channels and mapping of transport channels onto physical channels (FDD) (Release 4); 3GPP TS25.212, V4.6.0 (2002-09), 3rd generation Partnership Project; Technical Specification. Group Radio Access Network; Multiplexing and channel coding (FDD) (Release 4); 3GPP TS25.213, V4.4.0 (2003-12), 3rd generation Partnership Project; Technical Specification Group Radio Access Network; Spreading and modulation (FDD); 3GPP TS25.214, V4.6.0 (2003-03), 3rd generation Partnership Project; Technical Specification Group Radio Access Network; Physical layer procedures (FDD) (Release 4); and 3GPP TS25.215, V4.8.0 (2005-03), 3rd generation Partnership Project; Technical Specification Group Radio Access Network; Physical layer-Measurements (FDD) (Release 4).

The CPCH was defined in Section 4.1.2.5 of 3GPP TS25.211 as being an uplink transport channel that is associated with a dedicated channel on the downlink which provides power control and CPCH control commands (e.g., emergency stop) for the uplink CPCH. The CPCH is characterized by having an initial collision risk, and by being transmitted using inner loop power control commands.

However, the CPCH was not implemented and it was removed from 3GPP Release 5 specifications. The CPCH thus did not include L1 enhancements, since these enhancements were included for the uplink only with HSUPA in Release 6. The L1 enhancements include fast L1 retransmission, Hybrid ARQ, and fast capacity allocations.

SUMMARY OF THE INVENTION

A first embodiment of the invention is an electronic device comprising: communication apparatus configured for bidirectional communication in a wireless communications network; and a control apparatus configured to cause the electronic device to request a high speed random access channel from the wireless communications network; to receive a high speed random access channel assignment from the wireless communications network; and to transmit a message over the high speed random access channel.

A second embodiment of the invention is an electronic device comprising: a communication apparatus configured for bidirectional communication in a wireless communications network; and control apparatus configured to operate the electronic device to search for and to receive a request for a high speed random access channel from a second electronic device operating in the wireless communications network; to select a high speed random access channel for use by the second electronic device operating in the wireless communications network; and to transmit a message to the second electronic device, the message containing channel assignment information indicating the high speed random access channel assigned to the second electronic device.

A third embodiment of the invention is a computer program product comprising a computer readable memory medium tangibly embodying a computer program, the computer program configured to operate an electronic device in a wireless communications network, wherein when executed, the computer program is configured to cause the electronic device to request a high speed random access channel from the wireless communications network; to receive a high speed random access channel assignment from the wireless communications network; and to transmit a message over the high speed random access channel.

A fourth embodiment of the invention is a computer program product comprising a computer readable memory medium tangibly embodying a computer program, the computer program configured to operate an electronic device in a wireless communications network, wherein when executed the computer program is configured to cause the electronic device to search for and receive a request for a high speed random access channel from a second electronic device operating in the wireless communications network; to select a high speed random access channel for use by the second electronic device operating in the wireless communications network; and to transmit a message to the second electronic device, the message containing channel assignment information indicating the high speed random access channel assigned to the second electronic device.

A fifth embodiment of the invention is an electronic device comprising: communication means for performing bidirectional communication operations in a wireless communications network; and control means for requesting a high speed random access channel from the wireless communications network using the communication means; for receiving a high speed random access channel assignment from the wireless communications network using the communication means; and for transmitting a message over the high speed random access channel using the communication means.

A sixth embodiment of the invention is an electronic device comprising: communication means for performing bidirectional communication operations in a wireless communications network; and control means for searching for and receiving a request for a high speed random access channel from a second electronic device operating in the wireless communications network using the communication means; for selecting a high speed random access channel for use by the second electronic device operating in the wireless communications network; and for transmitting a message to the second electronic device using the communication means, the message containing channel assignment information indicating the high speed random access channel assigned to the second electronic device.

In conclusion, the foregoing summary of the embodiments of the present invention is exemplary and non-limiting. For example, one of ordinary skill in the art will understand that one or more aspects or operations from one embodiment can be combined with one or more aspects or operations from another embodiment to create a new embodiment within the scope of the invention.

DETAILED DESCRIPTION

Figure 1:
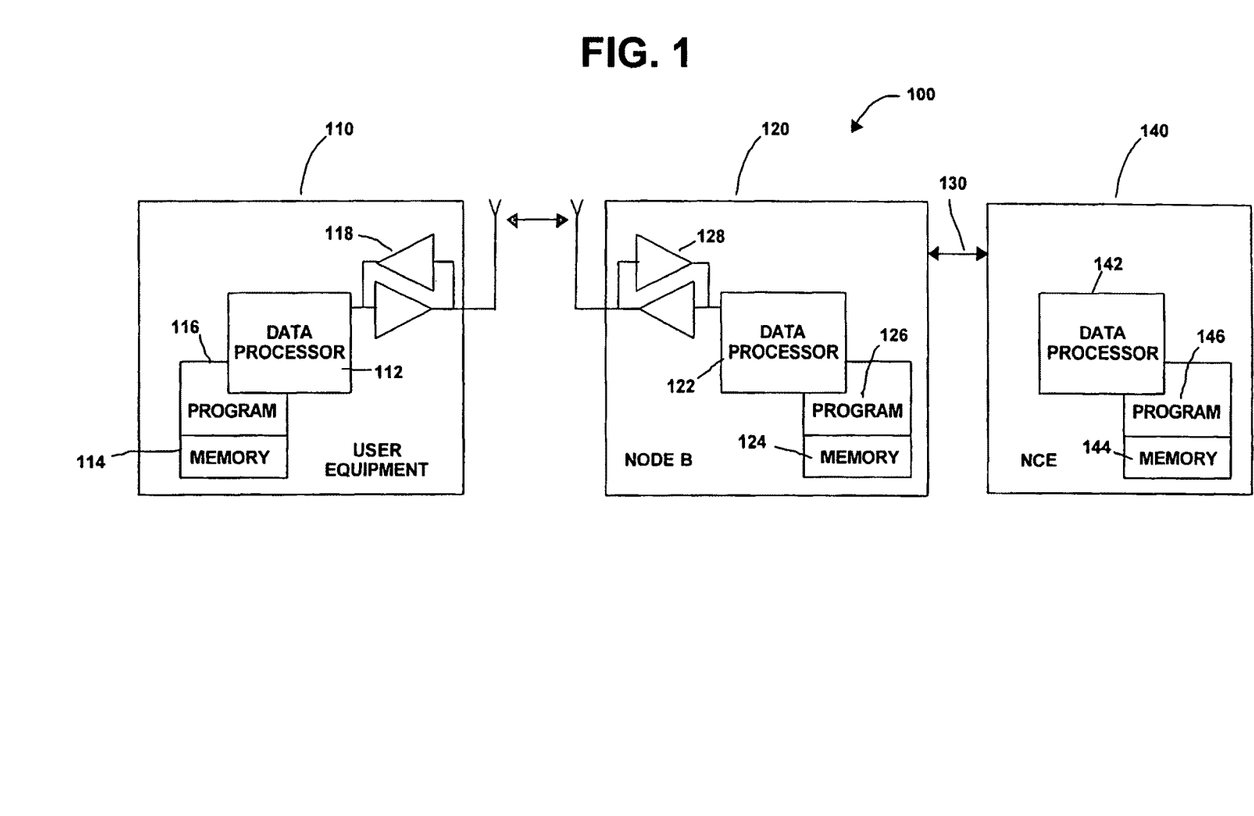
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 100 is adapted for communication with a UE 110 via a Node B (base station) 120. The network 100 may include a network control element (NCE) 140. The UE 110 includes a data processor (DP) 112, a memory (MEM) 114 that stores a program (PROG) 116, and a suitable radio frequency (RF) transceiver 118 for bidirectional wireless communications with the Node B 120, which also includes a DP 122, a MEM 124 that stores a PROG 126, and a suitable RF transceiver 128. The Node B 120 is coupled via a data path 130 to the NCE 140 that also includes a DP 142 and a MEM 144 storing an associated PROG 146. At least one of the PROGs 116 and 126 is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 112 of the UE 110 and by the DP 122 of the Node B 120, or by hardware, or by a combination of software and hardware.

In general, the various embodiments of the UE 110 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 114, 124 and 144 may be of any type suitable to the local technical environment and may be implemented using any suitable data storage technology, such as semiconductor-based memory devices, magnetic memory devices and systems, optical memory devices and systems, fixed memory and removable memory. The DPs 112, 122 and 142 may be of any type suitable to the local technical environment, and may include one or more of general purpose computers, special purpose computers, microprocessors, digital signal processors (DSPs) and processors based on a multi-core processor architecture, as non-limiting examples.

Figure 2:
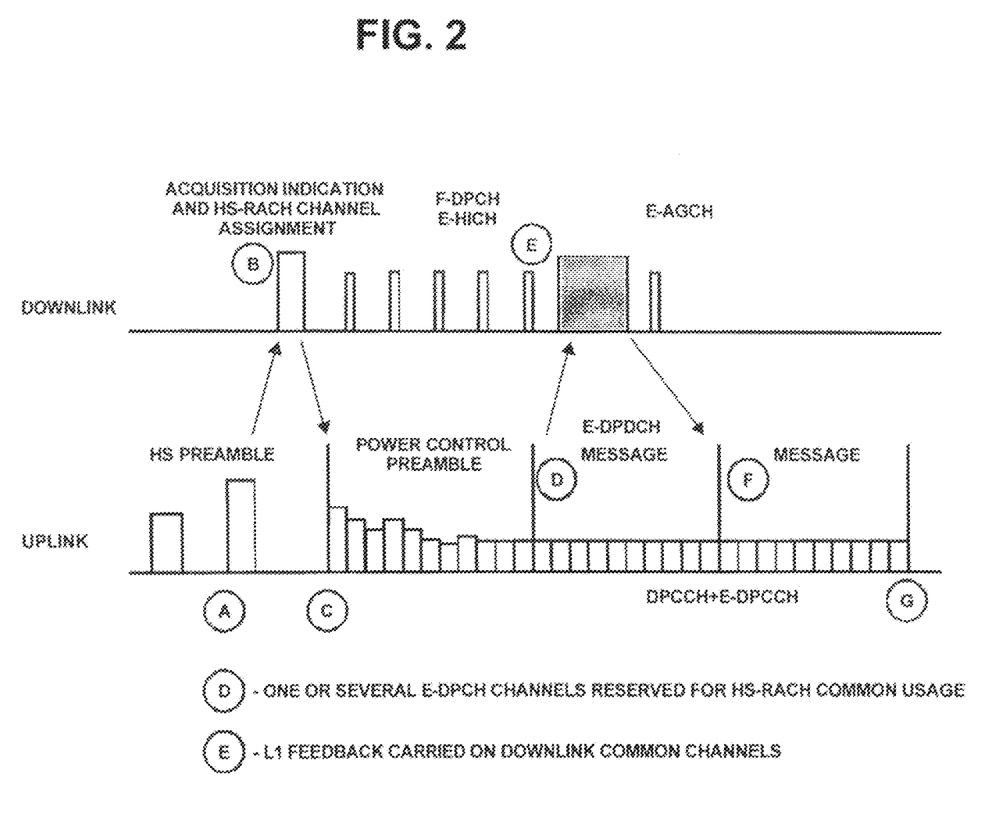
FIG. 2 shows a non-limiting arrangement of uplink channels and downlink channels for implementing the HS-RACH in accordance with the exemplary embodiments of this invention.

The exemplary embodiments of this invention provide a high speed RACH (HS-RACH), as illustrated in FIG. 2. It should be noted that the exemplary embodiments of this invention use existing (already specified) physical channels as shared channels.

More specifically one or several uplink E-DPDCH and E-DPCCH are used as shared channels, and one or several sets of downlink L1 feedback channels are used as shared channels. The downlink L1 feedback channels carry power control (F-DPCH), re-transmission requests (ACK/NACK, E-HICH) and capacity allocations (E-AGCH), while the uplink shared channels are used to transmit a message (which may include data) from the UE 110 to the Node B 120.

In accordance with exemplary embodiments of a method, apparatus and computer program product(s) at point A in FIG. 2 the UE 110 sends a HS preamble, and at point B the Node B 120 sends an acquisition indication and a HS-RACH channel assignment to the UE 110. At this point the UE 110 is assigned a unique spreading code for use with its uplink transmissions so that the Node-B 120 can identify those HS-RACH transmissions sent by the UE 110. At point C there is started a power control preamble procedure (e.g., for about 10 ms to about 30 ms) in cooperation with downlink F-DPCH, E-HICH channels to adjust the power level of the uplink E-DPDCH to be used by the UE 110 as a RACH. At the point D one or several E-DPCHs are reserved for the HS-RACH common usage and data transmission begins over the E-DPDCH at a first bit rate, while the DPCCH and E-DPCCH are used for power reference and for control information. Point E shows the L1 feedback (e.g., ACK/NACK feedback and power control commands) is carried on the downlink channels for the message being sent using the E-DPDCH At point F, and in response to the UE 110 receiving a capacity allocation on the E-DCH absolute grant channel (E-AGCH), the data transmission continues to be sent over the HS-RACH using the E-DPDCH but at a second, typically higher bit rate, while the DPCCH and E-DPCCH continue to be used for power reference and for control information, until completed at point G. Note that these various channels (e.g., the E-DPDCH) are actually defined in the standards for use only in the dedicated mode, and not as shared channels.

It can be noted that in the non-limiting example of FIG. 2 the preamble (point A) is sent as an unmodified PRACH preamble, where the selected signature/access slot combination indicates that the access request is for the HS-RACH.

Figure 3:
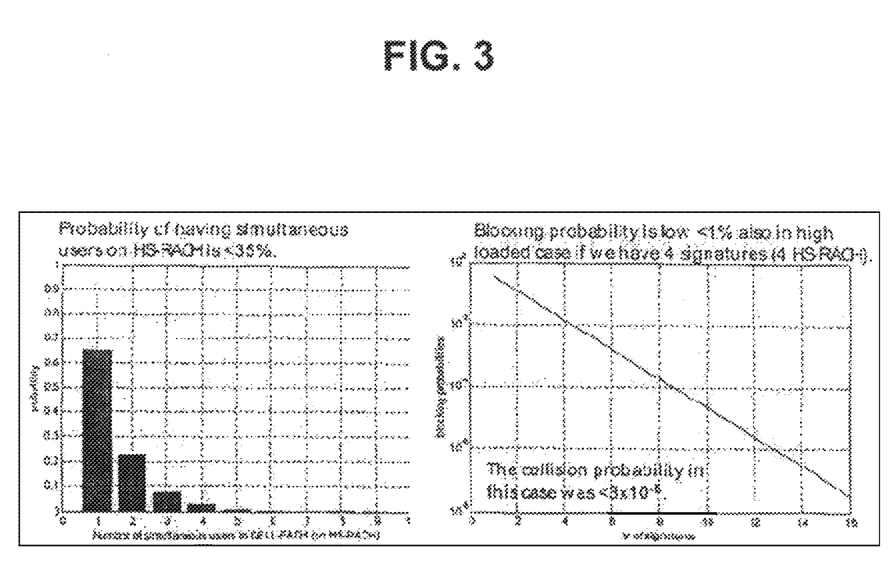
FIG. 3 illustrates two graphs showing the results of simulations of the HS-RACH capacity.

FIG. 3 shows the results of a simulation of the HS-RACH capacity. The simulations assume as an example a total of 2500 uploads per cell per hour. Each user is assumed to stay 500 ms on the HS-RACH before moving to Cell_DCH state. The results show that four HS-RACH channels will provide<5% blocking probability during the heavy loading. Note that it is within the scope of the exemplary embodiments to begin operation in the cell with a single HS-RACH, and then subsequently upgrade the capacity according to the traffic needs. The simulations also show that if there are four signatures in place, the collision probability is negligible<0.01%.

As should be appreciated, by assigning and managing one or more uplink dedicated mode channels as one or more uplink RACH channels the uplink RACH data rate is increased significantly from <10 kbps to some hundreds of kbps or even beyond 1 Mbps. An additional advantage is that more applications can be run that use just common channels using enhanced CELL FACH state enabling data rates by using HSDPA techniques for the downlink data and HSUPA techniques for the uplink data transmission. In addition, the end user response time is considerably lower since the end user can access a high data rate channel before entering the Cell_DCH state. A still further advantage of the use of the exemplary embodiments of this invention is that a state transition from Cell_FACH to Cell_DCH is nearly seamless, as it implies just a change of spreading code in the uplink. Further, the implementation is simplified as no new channels need be defined, since existing physical channels used with E-DCH are reused to provide the HS-RACH capability.

Based on the foregoing it should be apparent that the exemplary embodiments of this invention provide a method, apparatus and computer program product(s) to implement an uplink, high speed capable channel by assigning channels normally used for a dedicated mode of connection for use by a plurality of UEs in a random access manner.

Figure 4:
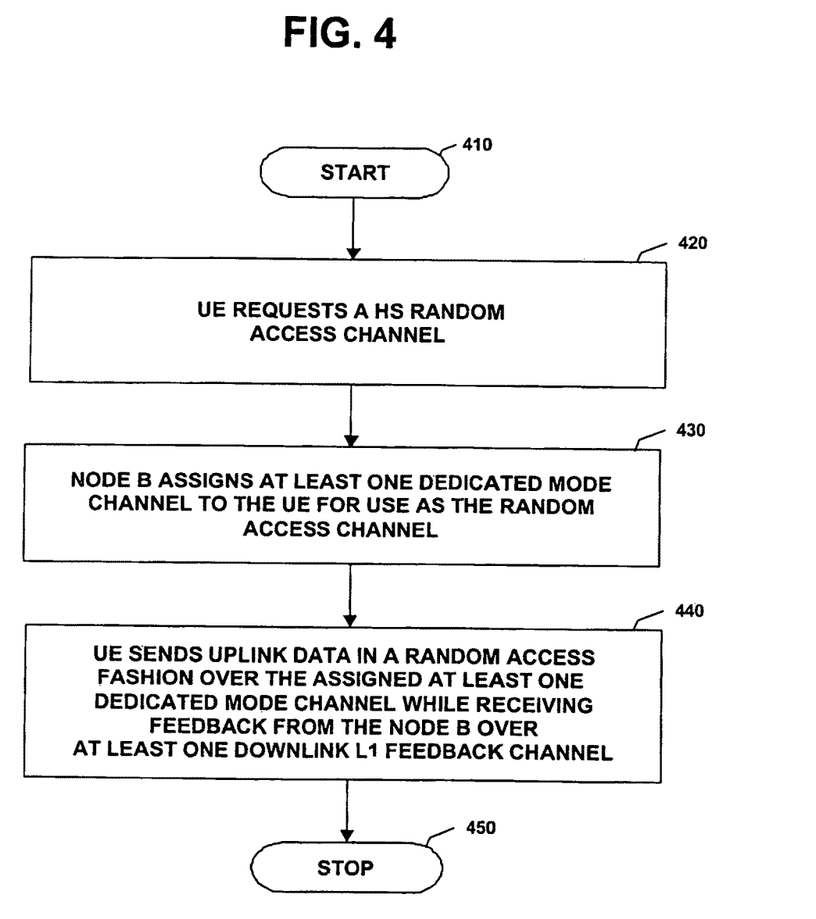
FIG. 4 is a logic flow diagram that is descriptive of a method and a computer program product executed by the UE of FIG. 1.

Referring to FIG. 4, in a method and a computer program product that starts at 410 the UE next at 420 requests a HS random access channel. Then, at 430 the Node B assigns at least one dedicated mode channel to the UE for use as the random access channel. Next, at 440 the UE sends uplink data in a random access fashion over the assigned at least one dedicated mode channel while receiving feedback from the Node B over at least one downlink L1 feedback channel. The method then stops at 450.

In the method the at least one dedicated mode channel comprises at least one of an E-DPDCH and E-DPCCH, and the at least one downlink L1 feedback channel comprises at least one of a DPCH, F-DPCH, E-HICH, E-RGCH and E-AGCH.

In the use of exemplary embodiments it should be noted that the DPCH and F-DPCH are mutually exclusive, and one may be used or the other. Further, the DPCH is a combination of DPCCH and DPDCH (in the downlink), and thus in this context one may employ either the DPCH or the DPCCH.

Note that the various blocks shown in FIG. 4 may be viewed as method steps, and/or as operations that result from operation of computer program code, and/or as a plurality of coupled logic circuit elements constructed to carry out the associated function(s).

Thus, also disclosed is a UE that comprises circuitry to request a HS random access channel and, in response to receiving an assignment from a Node B of a dedicated mode channel for use as the random access channel, to send uplink data in a random access fashion over the assigned dedicated mode channel while receiving feedback from the Node B over at least one downlink L1 feedback channel.

The at least one dedicated mode channel comprises at least one of an E-DPDCH and E-DPCCH, and the at least one downlink L1 feedback channel comprises at least one of a DPCH, F-DPCH, E-HICH, E-RGCH and E-AGCH.

A Node-B method, computer program product and apparatus is also disclosed that functions to assign to a UE a dedicated mode channel for use as the random access channel, to receive uplink data in a random access fashion over the assigned dedicated mode channel, and to send feedback information to the UE over at least one downlink L1 feedback channel.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus comprising at least one processor; and at least one memory including computer program code, the at least one memory and the computer program code configured to, with the at least one processor, cause the apparatus to perform at least the following:
    to cause the apparatus to request a high speed random access channel from a wireless communications network, where the high speed random access channel comprises a first channel configured as an enhanced dedicated physical channel;
    to receive a high speed random access channel assignment from the wireless communications network, wherein the high speed random access channel assignment comprises an indication of the first channel;
    to transmit a first portion of a message over the high speed random access channel at a first bit rate;
    to receive a capacity allocation message, wherein the capacity allocation message is received on an enhanced dedicated absolute grant channel;
    in response to receiving the capacity allocation message, to transmit a second portion of the message using the enhanced dedicated physical channel over the high speed random access channel at a second bit rate, where the second bit rate differs from the first bit rate; and
    to receive a retransmission request on a physical layer feedback channel.

2. The apparatus of claim 1 wherein the enhanced dedicated physical channel is at least one of an enhanced dedicated physical data channel and an enhanced dedicated physical control channel.

3. The apparatus of claim 1 wherein the at least one memory and the computer program code are further configured to cause the apparatus to receive a power control message from the wireless communications network.

4. The apparatus of claim 3 wherein the power control message is received on a fractional dedicated physical channel.

5. The apparatus of claim 1 wherein the retransmission request is received on an enhanced dedicated hybrid automatic repeat request channel.

6. The apparatus of claim 1 wherein the enhanced dedicated physical channel and the enhanced dedicated absolute grant channel are used as shared channels.

7. The apparatus of claim 1, where the second bit rate is higher than the first bit rate.

8. The apparatus of claim 1, where the high speed random access channel assignment further comprises a unique spreading code for use by the apparatus when transmitting.

9. The apparatus of claim 1, where, when transmitting in a first state, the apparatus uses a first spreading code when transmitting and, when transmitting in a second state, the apparatus uses a second spreading code when transmitting.

10. The apparatus of claim 9, where the at least one memory and the computer program code are further configured to transition from the first state to the second state by changing from using the first spreading code to using the second spreading code.

11. The apparatus of claim 9, where the first state is a Cell_FACH state and the second state is a Cell_DCH state.

12. The apparatus of claim 11, where physical channels used in the first state are reused in the second state.

13. An apparatus comprising at least one processor; and at least one memory including computer program code, the at least one memory and the computer program code configured to, with the at least one processor, cause the apparatus to perform at least the following:
    to cause the apparatus to search for and receive a request for a high speed random access channel from a second apparatus operating in a wireless communications network;
    to select a channel as a high speed random access channel for use by the second apparatus operating in the wireless communications network, wherein the high speed random access channel comprises a first channel configured as an enhanced dedicated physical channel;
    to transmit an assignment message to the second apparatus, the assignment message containing channel assignment information comprising an indication of the first channel assigned to the second apparatus;
    to receive a first portion of a message over the first channel at a first bit rate;
    to transmit a capacity allocation message, wherein the capacity allocation message is transmitted on an enhanced dedicated absolute grant channel;
    in response to transmitting the capacity allocation message, to receive a second portion of the message over the first channel at a second bit rate, where the second bit rate differs from the first bit rate; and
    to transmit a retransmission request on a physical layer feedback channel.

14. The apparatus of claim 13 wherein the enhanced dedicated physical channel is at least one of an enhanced dedicated physical data channel and an enhanced dedicated physical control channel.

15. The apparatus of claim 13 wherein the at least one memory and the computer program code are further configured to cause the apparatus to transmit a power control message to the second apparatus.

16. The apparatus of claim 15 wherein the power control message is transmitted on a fractional dedicated physical channel.

17. The apparatus of claim 13 wherein the retransmission request is transmitted on an enhanced dedicated hybrid automatic repeat request channel.

18. The apparatus of claim 13 wherein the enhanced dedicated physical channel and the enhanced dedicated absolute grant channel are used as shared channels.

19. A computer readable memory medium tangibly encoded with a computer program executable by a processor to perform actions comprising:
to request a high speed random access channel from a wireless communications network, where the high speed random access channel comprises a first channel configured as an enhanced dedicated physical channel;
to search for and receive a high speed random access channel assignment from the wireless communications network, wherein the high speed random access channel assignment comprises an indication of the first channel;
to transmit a first portion of a message over the high speed random access channel at a first bit rate;
to receive a capacity allocation message, wherein the capacity allocation message is received on an enhanced dedicated absolute grant channel;
in response to receiving the capacity allocation message, to transmit a second portion of the message using the enhanced dedicated physical channel over the high speed random access channel at a second bit rate, where the second bit rate differs from the first bit rate; and
to receive a retransmission request on a physical layer feedback channel.

20. A computer readable memory medium tangibly encoded with a computer program executable by a processor to perform actions comprising:
to receive a request for a high speed random access channel from a second apparatus operating in a wireless communications network;
to select a channel as a high speed random access channel for use by the second apparatus operating in the wireless communications network, where the high speed random access channel comprises a first channel configured as an enhanced dedicated physical channel;
to transmit an assignment message to the second apparatus, the assignment message containing channel assignment information comprising an indication of the first channel assigned to the second apparatus;
to receive a first portion of a message over the first channel at a first bit rate;
to transmit a capacity allocation message, wherein the capacity allocation message is transmitted on an enhanced dedicated absolute grant channel;
in response to transmitting the capacity allocation message, to receive a second portion of the message over the first channel at a second bit rate, where the second bit rate differs from the first bit rate; and
to transmit a retransmission request on a physical layer feedback channel.

21. An apparatus comprising:
means for requesting a high speed random access channel from a wireless communications network, where the high speed random access channel comprises a first channel configured as an enhanced dedicated physical channel;
means for receiving a high speed random access channel assignment from the wireless communications network, wherein the high speed random access channel assignment comprises an indication of the first channel;
means for transmitting a first portion of a message over the high speed random access channel at a first bit rate;
means for receiving a capacity allocation message, wherein the capacity allocation message is received on an enhanced dedicated absolute grant channel;
means for transmitting a second portion of the message using the enhanced dedicated physical channel over the high speed random access channel at a second bit rate in response to receiving the capacity allocation message, where the second bit rate differs from the first bit rate; and
means for receiving a retransmission request on a physical layer feedback channel.

22. An apparatus comprising:
means for receiving a request for a high speed random access channel from a second apparatus operating in a wireless communications network;
means for selecting a selected channel as a high speed random access channel for use by the second apparatus operating in the wireless communications network, where the high speed random access channel comprises a first channel configured as an enhanced dedicated physical channel;
means for transmitting an assignment message to the second apparatus, the assignment message containing channel assignment information comprising an indication of the high speed random access first channel assigned to the second apparatus;
means for receiving a first portion of a message over the first channel at a first bit rate;
means for transmitting a capacity allocation message, wherein the capacity allocation message is transmitted on an enhanced dedicated absolute grant channel;
means for receiving a second portion of the message over the first channel at a second bit rate in response to transmitting the capacity allocation message, where the second bit rate differs from the first bit rate; and
means for transmitting a retransmission request on a physical layer feedback channel.

* * * * *